(12) United States Patent
Gurtuna et al.

(10) Patent No.: US 7,231,376 B1
(45) Date of Patent: Jun. 12, 2007

(54) METHOD FOR HIGH-LEVEL PARALLELIZATION OF LARGE SCALE QP OPTIMIZATION PROBLEMS

(75) Inventors: Filiz Gurtuna, Baltimore, MD (US); Aleksey M. Urmanov, San Diego, CA (US); Kenny C. Gross, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 131 days.

(21) Appl. No.: 11/111,031

(22) Filed: Apr. 21, 2005

(51) Int. Cl.
*G06F 15/18* (2006.01)
(52) U.S. Cl. .......................... 706/12; 706/14; 706/16; 706/45
(58) Field of Classification Search .................. 706/12, 706/14, 16, 45
See application file for complete search history.

(56) References Cited

U.S. PATENT DOCUMENTS

2006/0112026 A1* 5/2006 Graf et al. .................... 706/14

OTHER PUBLICATIONS

R. Collobert and S. Bengio and Y. Bengio, "A Parallel Mixture of SVMs for Very Large Scale Problems", Advances in Neural Information Processing Systems, 2002, MIT Press url=http://citeseer.ist.psu.edu/collobert02parallel.html.*

J. Platt, "Sequential Minimal Optimization: A Fast Algorithm for Training Support Vector Machines" Technical Report 98-14, Microsoft Research, Redmond, Washington, Apr. 1998 url=citeseer.ist.psu.edu/platt98sequential.html.*

Pavel Laskov, "Feasible Direction Decomposition Algorithms for Training Support Vector Machines", Machine Learning, vol. 46, 1-3, publisher="Kluwer Academic Publishers, Boston", pp.="315-349", year="2002", url=citeseer.ist.psu.edu/laskov01feasible.html Only p. 315, 324-325 are furnished with this office action.*

* cited by examiner

*Primary Examiner*—Joseph P Hirl
*Assistant Examiner*—Lut Wong
(74) *Attorney, Agent, or Firm*—Park, Vaughan & Fleming, LLP; Shun Yao (57) ABSTRACT

One embodiment of the present invention provides a system that performs high-level parallelization of large scale quadratic-problem (QP) optimization. During operation, the system receives a training dataset comprised of a number of data vectors. The system first determines to what extent each data vector violates conditions associated with a current support vector machine (SVM). The system then sorts the data vectors based on each data vector's degree of violation. Next, the system partitions the sorted data vectors into a number of prioritized subsets, wherein the subset with the highest priority contains the largest number of violators with the highest degree of violation. The system subsequently solves in parallel a QP optimization problem for each subset based on the subset's priority. The system then constructs a new SVM to replace the current SVM based on the QP optimization solution for each subset.

17 Claims, 4 Drawing Sheets

METHOD FOR HIGH-LEVEL PARALLELIZATION OF LARGE SCALE QP OPTIMIZATION PROBLEMS

BACKGROUND

The present invention relates to techniques for computer-based classification, which can be used to identify members of groups of interest within datasets.

Classification and pattern recognition techniques have wide-reaching applications. For example, a number of life science applications use classification techniques to identify members of groups of interest within clinical datasets. In particular, one important application involves distinguishing the protein signatures of patients with certain type of cancer from the protein signatures of patients who do not. This problem stems from the need in clinical trials to test the efficacy of a drug in curing cancer while the cancer is at an early stage. In order to do so, one needs to be able to identify patients who have cancer at an early stage.

Conventional diagnostic techniques are not sufficient for this application. A popular technique (from an area that has become known as "proteomics") is to analyze mass spectra, which are produced by a mass spectrometer from serum samples of patients. Depending on the type of cancer, the mass spectra of serum samples can show distinct signatures, which are not immediately visible to the naked eye. Several existing data mining techniques are presently used to distinguish the cancer spectra from the normal ones, such as Naïve Bayes, Decision Trees, Principle-Components-Analysis based techniques, Neural Networks, etc.

However, these existing techniques are characterized by false-alarm and missed-alarm probabilities that are not sufficiently small. This is a problem because false alarms can cause patients to experience anxiety, and can cause them submit to unnecessary biopsies or other procedures, while missed alarms can result in progression of an undetected disease.

Support Vector Machines (SVMs) provide a new approach to pattern classification problems. SVM-based techniques are particularly attractive for the cancer classification problem because SVM-based techniques operate robustly for high-dimensional feature data, unlike other techniques which have resource requirements that are closely coupled with feature dimensions.

However, the application of SVM's in areas involving huge datasets, such as in proteomics, is constrained by extremely high computation cost, in terms of both the compute cycles needed as well as enormous physical memory requirements.

For example, a quadratic optimization problem arises during the training phase of the SVM's for large datasets, which are common in most life sciences problems. Such a quadratic optimization problem typically requires the memory to accommodate an N×N matrix, where N is the number of data vectors. This creates huge challenges for conventional high-end enterprise computer servers when the input datasets contain thousands or tens of thousands of data vectors. In addition, the training time for the algorithm grows in a manner that is polynomial in N. Current state-of-the-art research papers propose using heuristic, data-level decomposition approaches. Certain approaches, such as the active set method, have been proven to converge. However, none of the existing convergent decomposition methods can solve large scale QP optimization problems. On the other hand, existing methods which are capable of dealing with large scale problems cannot provide an ideal misclassification error rate.

SUMMARY

One embodiment of the present invention provides a system that performs high-level parallelization of large scale quadratic-problem (QP) optimization. During operation, the system receives a training dataset comprised of a number of data vectors. The system first determines to what extent each data vector violates conditions associated with a current support vector machine (SVM). The system then sorts the data vectors based on each data vector's degree of violation. Next, the system partitions the sorted data vectors into a number of prioritized subsets, wherein the subset with the highest priority contains the largest number of violators with the highest degree of violation. The system subsequently solves in parallel a QP optimization problem for each subset based on the subset's priority. The system then constructs a new SVM to replace the current SVM based on the QP optimization solution for each subset.

In a variation of this embodiment, if any data vector in the dataset violates conditions associated with the new SVM, the system iteratively performs the following operations until no data vector violates conditions associated with the SVM. The system first determines to what extent each data vector violates conditions associated with a current SVM. The system then sorts the data vectors based on each data vector's degree of violation. Next, the system partitions the sorted data vectors into a number of prioritized subsets, wherein the subset with the highest priority contains the largest number of violators with the highest degree of violation. The system subsequently solves in parallel a QP optimization problem for each subset based on the subset's priority. The system then constructs a new SVM to replace the current SVM based on the QP optimization solution for each subset.

In a further variation, constructing the new SVM involves combining the QP optimization solution obtained in the current iteration for the subset with the highest priority with the QP optimization solutions obtained in the previous iteration for the rest subsets.

In a variation of this embodiment, sorting the data vectors involves sorting the data vectors in a descending order with respect to each data vector's degree of violation.

In a variation of this embodiment, the initial SVM contains either no support vectors, or a set of existing support vectors obtained based on prior knowledge of the dataset.

In a variation of this embodiment, solving the QP optimization problem for each subset based on the subset's priority involves formulating an objective function for the QP optimization problem, wherein the objective function includes interaction terms which are based on subsets whose priority is lower than the present subset's priority.

In a variation of this embodiment, determining whether any vector in the dataset violates conditions associated with the SVM involves evaluating whether each data vector violates Karush-Kuhn-Tucker (KKT) conditions for the current SVM.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs).

Multiprocessor System

Figure 1:
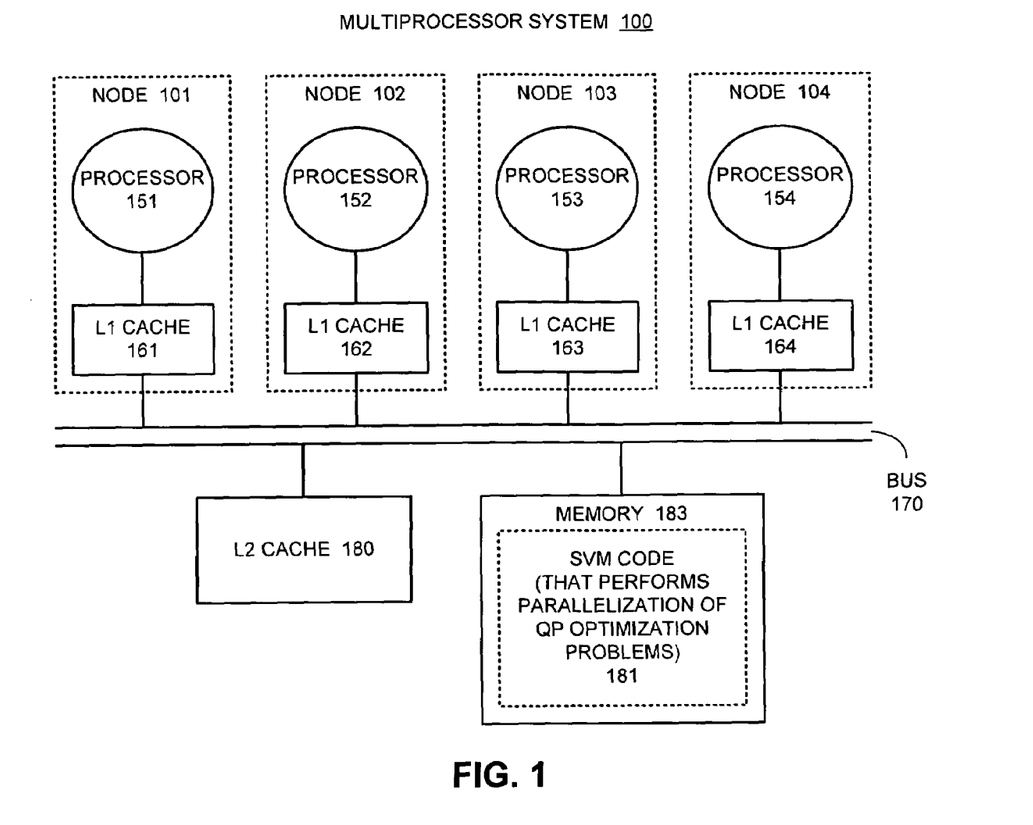
FIG. 1 illustrates a multiprocessor system in accordance with an embodiment of the present invention.

FIG. 1 illustrates an exemplary multiprocessor system 100 in accordance with an embodiment of the present invention. Multiprocessor system 100 is a shared-memory multiprocessor system and includes a number of processors 151–154 coupled to level one (L1) caches 161–164 which share a level two (L2) cache 180 and a memory 183. Memory 183 contains SVM code that performs parallelization of QP optimization problems for fast training of large scale SVMs. This parallelization process is described in more detail below.

During operation, if a processor 151 accesses a data item that is not present in local L1 cache 161, the system attempts to retrieve the data item from L2 cache 180. If the data item is not present in L2 cache 180, the system first retrieves the data item from memory 183 into L2 cache 180, and then from L2 cache 180 into L1 cache 161.

Multiprocessor system 100 also supports a coherency protocol that operates across bus 170. This coherency protocol ensures that if one copy of a data item is modified in L1 cache 161, other copies of the same data item in L1 caches 162–164, in L2 cache 180 and in memory 183 are updated or invalidated to reflect the modification.

Although the present invention is described in the context of the shared-memory multiprocessor system 100, the present invention is not meant to be limited to such a system. In general, the present invention can operate in any computer system or distributed system which contains multiple processors. For example, the present invention can operate in a distributed computing system in which separate computing systems are coupled together through a network. Hence, the term "multiprocessor system," as used in this specification and the appended claims, refers to any computer system or distributed system containing multiple processors which can work together on a given computational task.

Support Vector Machine

One embodiment of the present invention facilitates training of large scale SVMs in reasonable time using limited resources. This procedure reformulates the SVM training problem into a quadratic optimization problem (QP) with specific constraints on the variables. In this way, standard numerical solvers can be used to solve SVM training problems. The rest of this section explains the process of formulating an SVM training problem into a quadratic problem.

First, let $X_i$ denote an m-dimensional vector, i.e., $X_i \in R^m$. Vector $X_i$ represents a data point in a data set, such as a snapshot of the physical telemetry signals of a computer server or a protein mass spectrum obtained from a mass spectrometer. In addition, let D denote a data set of n such data points:

$$D=\{X_i, Y_i\}, i=1, \ldots, n$$

where $Y_i \in \{-1, +1\}$ represents the presence (+1) or absence (−1) of the property or feature of interest for point $X_i$. Data set D is generally called a training data set, because it is used to build an SVM.

For example, $X_i$ can be a sample of a blood mass spectrum. Each element of a vector data point represents the amplitude at a certain m/z value. A nonzero amplitude means that there is a peptide or a peptide fragment with such mass in the blood sample. $Y_i$ represents the absence (−1) or presence (+1) of cancer in the patient. The goal is to build a classifier that uses X as an input and then correctly classifies the patient as having cancer or not having cancer.

To build an SVM for classification, the training data set D ideally includes examples from patients with and without cancer. Then, the classifier learns a differentiating feature in the data set which separates data points associated with cancer patients from those associated with non-cancer patients.

Given a training set D, an SVM is built by solving the following prime quadratic problem ($QP_0$):

($QP_0$): min $\|W\|^2$, subject to the following constraints:

$$\begin{cases} (\Phi(X_i) \cdot W) + b) \geq 1 - \xi_i, & \text{for } Y_i = +1 \\ (\Phi(X_i) \cdot W) + b) \geq 1 + \xi_i, & \text{for } Y_i = -1 \\ \xi_i \geq 0, \forall i \end{cases}$$

where $\Phi$ is a mapping function from $R^m$ space to some Euclidean space H called feature space:

$$\Phi: R^2 \to H.$$

$W \in H$ is a vector normal to the hyperplane that separates the points representing the two classes, b is an unknown scalar, and $\xi_i$ is a set of positive slack variables representing the penalty of incorrect classification. The solution to the problem above defines an optimal separating hyperplane.

It is more convenient to solve a Lagrangian formulation of this problem:

$$(QP_1): \max \sum_i a_i - 0.5 \times \sum_{i,j} a_i a_j Y_i Y_j K(X_i, X_j),$$

subject to the following constraints:

$$\begin{cases} 0 \leq a_i \leq C, i = 1, \ldots, n \\ \sum_i a_i Y_i = 0 \end{cases}$$

where $a_i$ is a set of Lagrange multipliers corresponding to the inequality constraints in the prime problem $QP_0$. Constant C represents the amount of penalty for incorrect classification, and $K(\bullet,\bullet)$ is a kernel function. Examples of kernel functions include $K(x,y)=x \cdot y$, $K(x,y)=(x \cdot y+1)^p$, and $K(x,y)=\tan h(kx \cdot y - \delta)$.

The optimal solution of problem $QP_1$, denoted as $a_i^*$, ideally satisfies the following conditions, namely the Karush-Kuhn-Tucker (KKT) conditions, of the prime problem $QP_0$:

$$\begin{cases} Y_i\left(\sum_j a_j Y_j K(X_i, X_j) + b\right) - 1 \geq 0; \text{ for } a_i = 0 \\ Y_i\left(\sum_j a_j Y_j K(X_i, X_j) + b\right) - 1 = 0; \text{ for } 0 < a_i < c \\ Y_i\left(\sum_j a_j Y_j K(X_i, X_j) + b\right) - 1 \geq -\xi_i; \text{ for } a_i = C, \xi_i \text{ is a positive scalar} \end{cases}$$

Data points $X_i$ for which there is a corresponding $0 < a_i < C$ are called support vectors and are denoted as $^SX_i$. Only support vectors are used for computing the separating hyperplane or for making a classification decision. All other data points can be removed from the training data set with no impact on the classification results.

The dimension of $QP_1$ is n, which is the number of data points in the training set. When n is large (e.g., n=1,000 or more), the classical sequential QP solvers become very slow and sometimes cannot find a solution at all. To overcome this problem, one embodiment of the present invention provides an approach for parallelization of the QP optimization problem $QP_1$, the solution of which produces the desired SVM.

Parallelization of QP Optimization Problem

One embodiment of the present invention uses a new technique for parallelization of QP optimization problem to perform SVM training in parallel. This approach allows solving arbitrarily large SVM problems using parallel processing. During operation, the system iteratively performs parallelization of QP optimization problems until a correct SVM is obtained. At the beginning of an iteration, the system first forms an initial support vector pool, $S=\{^SX_i, ^SY_i, i=1, \ldots, ^Sn\}$, based on prior knowledge about the problem, or based on the results from previous training iterations. (For example, the initial pool can be an empty set for a new problem.) Note that this pool serves as a starting point for adjusting the SVM to incorporate new information. When the training process is complete, this pool ideally contains the correct support vectors for the problem and the system terminates the iteration.

The system then checks the KKT conditions for the prime quadratic problem $QP_0$ to determine if the current solution is the optimal solution for the original problem. If the KKT conditions are satisfied for each $a_i$, then the original $QP_0$ has been solved and the current pool S contains the correct support vectors for the solution SVM. Otherwise, the system determines to what extent each data vector violates the KKT conditions and sorts the data vectors in a descending order with respect to the degree to which each data vector violates the KKT conditions.

Next, the system partitions the sorted data vectors into several subsets of smaller sizes. Each subset is denoted as $$D^g=\{(X^g, Y^g)\}=\{(X_i, Y_i), i \in I^g\}, g=1 \ldots G,$$

where $I^g$ denotes the set of indices of points in subset g. Note that the system can use different partition methods. In one embodiment of the present invention, the system partitions the data vectors based on a pre-determined number of data vectors per subset. In this way, the system can limit the computation complexity for each subset. Furthermore, each subset is assigned a priority $p_g$ which denotes the level of importance of each subset. In one embodiment, each subset's priority is represented by a value between 0 and 1. This results in a priority list P:

$$P=\{p_g \in [0,1]\}$$

wherein $p_g$ denotes the priority assigned to subset g. The subset whose index is 1 (g=1) has the highest priority $p_1=\max\{p_g\}$. In addition, the subset with the highest priority contains the largest number of violators with the highest degree of violation.

The priority of a QP optimization problem associated with a subset reflects how much influence the subset has on the objective function of the original $QP_0$. The subset with the highest priority carries the most weight in the parallel optimization process. After each iteration, a new pool of support vectors is obtained and the system checks the KKT conditions for each data vector again. The priority list is then updated based on the violators in the current iteration.

The priority list facilitates partitioning the original QP problem into subproblems. In one embodiment of the present invention, the system formulates a QP optimization subproblem for each subset based on its priority. Specifically, the objective function of the QP problem for a subset includes interaction terms based on all other subsets the priority of which is lower than the priority of the present subset. For example, the objective function of the QP problem for subset 1 includes interaction terms based on subsets 2, 3, . . . , g. Similarly, the objective function of the QP problem for subset 2 includes interaction terms based on subsets 3, 4, . . . , g. As a result, the system can solve these subproblems independently and benefits from faster convergence to the optimal solution. The formulation of objective functions for QP problem associated with each subset is described as follows:

$QP^1$:

max $-0.5 \times a_{(1)}^T Q_{(11)} a_{(1)} + (e_{(1)} - Q_{(12)} a_{(2)} - Q_{(13)} a_{(3)} - \ldots - Q_{(1G)} a_{(G)})^T a_{(1)}$;

where $Y_{(1)}^T a_{(1)} = -Y_{(2)}^T a_{(2)} - Y_{(3)}^T a_{(3)} - \ldots - Y_{(G)}^T a_{(G)}$, $0 \leq a_i \leq C, i \in I^1$.

$Qp^2$:

max $-0.5 \times a_{(2)}^T Q_{(22)} a_{(2)} + (e_{(2)} - Q_{(23)} a_{(3)} - Q_{(24)} a_{(4)} - \ldots - Q_{(2G)} a_{(G)})^T a_{(2)}$;

where $Y_{(2)}^T a_{(2)} = -Y_{(1)}^T a_{(3)} - \ldots - Y_{(G)}^T a_{(G)}$, $0 \leq a_i \leq C, i \in I^2$.

$Qp^3$:

$$\max -0.5 \times a_{(3)}{}^T Q_{(33)} a_{(3)} + (e_{(3)} - Q_{(34)} a_{(4)} - Q_{(35)} a_{(5)} - \ldots - Q_{(3G)} a_{(G)})^T a_{(3)};$$

where $Y_{(3)}{}^T a_{(3)} = -Y_{(1)}{}^T a_{(1)} - Y_{(2)}{}^T a_{(2)} - \ldots - Y_{(G)}{}^T a_{(G)}$, $0 \leq a_i \leq C$, is $i \in I^3$.

$QP^{G-1}$:

$$\max -0.5 \times a_{(G-1)}{}^T Q_{(G-1\ G-1)} a_{(G-1)} + (e_{(G-1)} - Q_{(G-1\ G)} a_{(G)})^T a_{(G-1)};$$

where $Y_{(G-1)}{}^T a_{(G-1)} = -Y_{(1)}{}^T a_{(1)} - Y_{(2)}{}^T a_{(2)} - \ldots - Y_{(G)}{}^T a_{(G)}$, $0 \leq a_i \leq C$, $i \in I^{G-1}$.

$QP^G$:

$$\max -0.5 \times a_{(G)}{}^T Q_{(G\ G)} a_{(G)} + e_{(G)}{}^T a_{(G)};$$

where $Y_{(G)}{}^T a_{(G)} = -Y_{(1)}{}^T a_{(1)} - Y_{(2)}{}^T a_{(2)} - \ldots - Y_{(G-1)}{}^T a_{(G-1)}$, $0 \leq a_i \leq C$, $i \in I^G$.

In the formulation above, $a_{(g)}$ is a vector of $a_i$'s for subset $D^g$: $a_{(g)} = [a_{i(1)}, a_{i(2)}, \ldots, a_{i(n^g)}]$, where $i(j) \in E_j^g$, $j = 1, 2, \ldots, n^g$, $n^1 + n^2 + \ldots + n^G = n$; and $Q_{(gh)}$ is a matrix whose element at row i and column j is $Y_i Y_j K(X_i, X_j)$, where $i \in I^g$, $j \in I^h$. In addition, $e_{(g)}$ is a standard vector for subset $D^g$ whose dimension is the same as that of $a_{(g)}$ and whose elements are unit 1s. The fact that these QP problems are independent allows the system to solve these problems in parallel using any existing quadratic solver.

At the end of iteration k, after the system solves $QP^1$, $QP^2, \ldots, QP^G$, the system combines the solutions of each subproblem $a_{(g)}*^{[k]}$ to advance towards the optimal solution of the original $QP_0$:

$$a*^{[k]} = [a_{(1)}*^{[k]} a_{(2)}*^{[k]} \ldots a_{(G)}*^{[k]}].$$

The system then checks the KKT conditions for every data vector based on the current solution. In one embodiment of the present invention, the system checks the KKT conditions based not on the latest solution at the current iteration, but on a solution that combines the solution for the highest-priority subset obtained during the current iteration and the solutions for the rest subsets obtained during the previous iteration:

$$a*^{[k]} = [a_{(1)}*^{[k]} a_{(2)}*^{[k-1]} \ldots a_{(G)}*^{[k-1]}]$$

If the solution obtained in the current iteration is not optimal, i.e., the KKT conditions are not satisfied, the system updates the priority list based on the new violators within each subset and repeats the iteration. This iterative process ensures the solutions to converge to the optimal solution. In addition, this parallelization process allows the size of each subproblem to remain the same for each iteration. Consequently, these subproblems continue to be tractable throughout the entire process.

Figure 2:
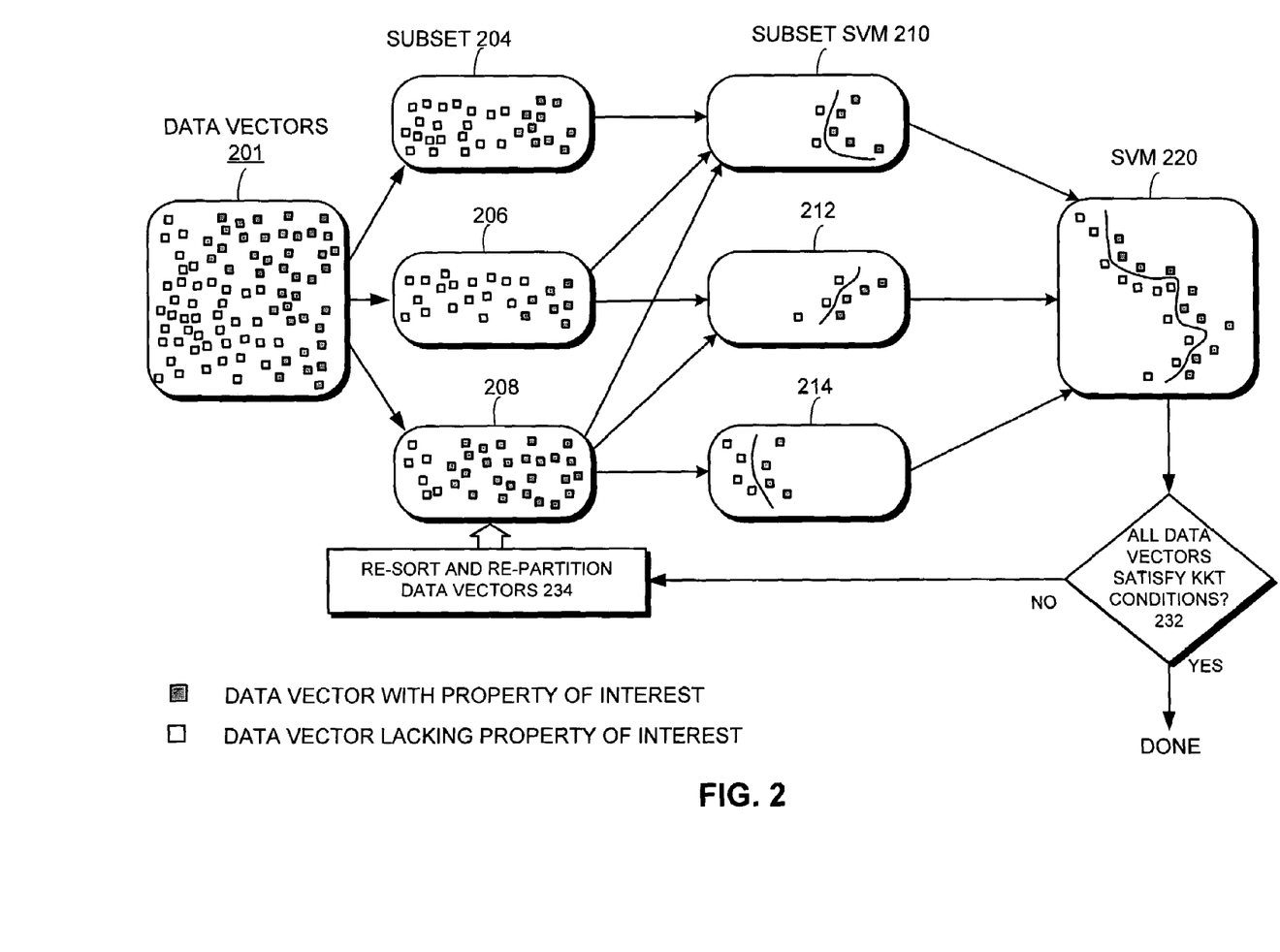
FIG. 2 illustrates the process of dividing data vectors into prioritized subsets and solving the corresponding QP optimization problems in parallel in accordance with an embodiment of the present invention.

FIG. 2 illustrates the process of dividing data vectors into prioritized subsets and solving the corresponding QP optimization problems in parallel in accordance with an embodiment of the present invention. In this example, data vectors are represented in dark squares (denoting data vectors with property of interest) and blank squares (denoting data vectors lacking property of interest). Initially, the system receives a set of training data vectors 201. The system then sorts the data vectors according to the extent to which each data vector violates the KKT conditions associated with a current SVM. The system subsequently partitions the sorted data vectors into prioritized subsets 204, 206, and 208. Note that the initial SVM may be either obtained based on prior knowledge of the data set, or simply an empty set. In this example, subset 204 is assigned the highest priority, subset 206 the intermediate priority, and subset 208 the lowest priority.

The system then solves the QP problem associated with each subset in parallel and obtains SVMs 210, 212, and 214, which correspond to subsets 204, 206, and 208, respectively. Next, these subset SVMs are combined into SVM 220. The system subsequently determines whether all data vectors satisfy the KKT conditions associated with SVM 220 (step 232). If so, the optimal solution for the original $QP_0$ problem is found and the system exits. If not, the system re-sorts and re-partitions the data vectors based on the new violators (step 234), and repeats the parallel QP-solving process.

Figure 3:
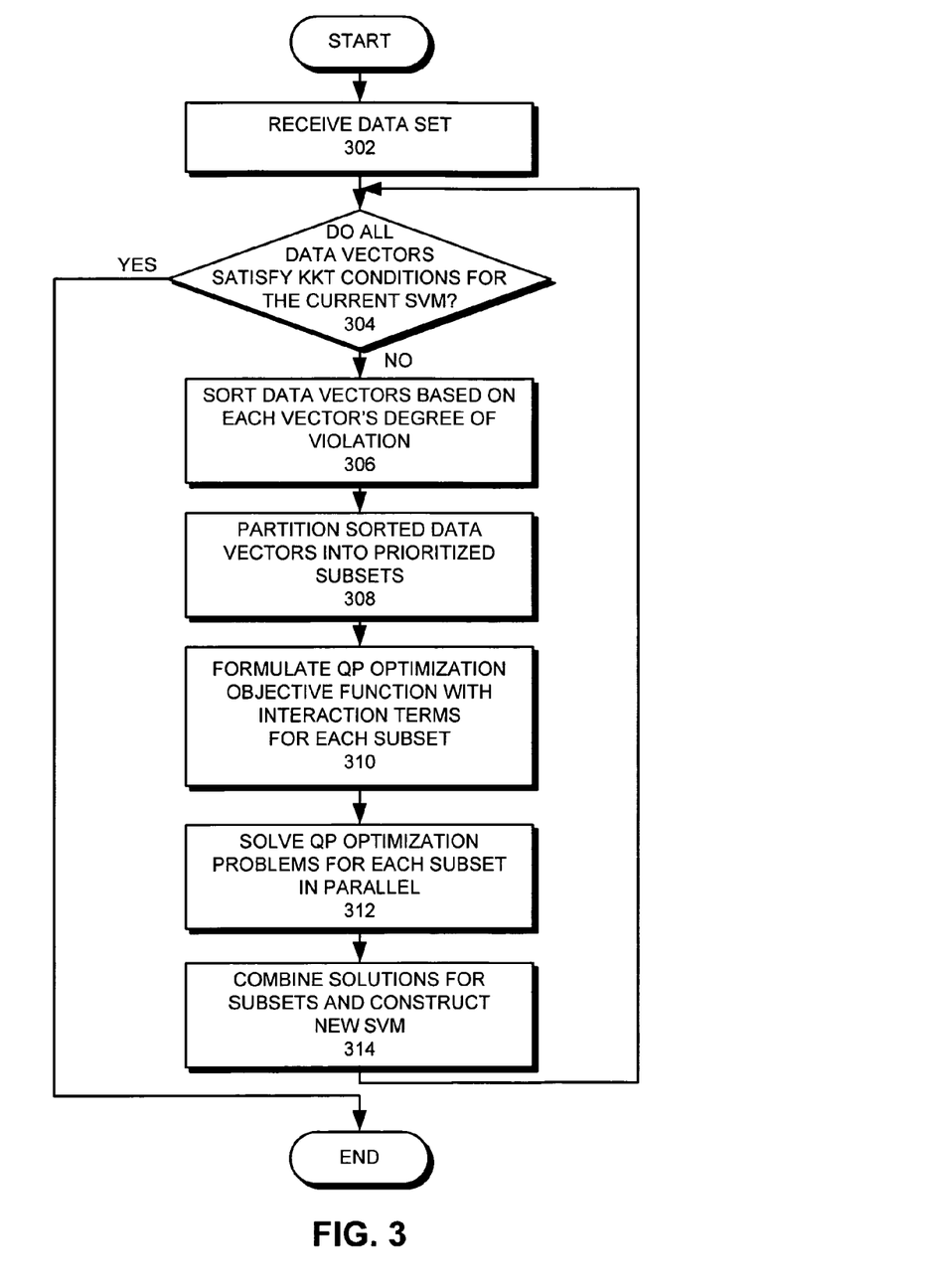
FIG. 3 presents a flow chart illustrating the process of formulating and solving QP optimization problems for the subsets in parallel in accordance with an embodiment of the present invention.

FIG. 3 presents a flow chart illustrating the process of formulating and solving QP optimization problems for the subsets in parallel in accordance with an embodiment of the present invention. During operation, the system starts by receiving a training data set (step 302). The system then determines whether all data vectors satisfy the KKT conditions associated with a current SVM (step 304). If so, the optimal solution for the original $QP_0$ problem is found and the system exits.

If there are data vectors which violate the KKT conditions for the current SVM, the system sorts the data vectors based on each data vector's degree of violation (step 306) and partition sorted data vectors into prioritized subsets (step 308). The system then formulates QP optimization objective functions with interaction terms for each subset (step 310). Next, the system solves the QP optimization problems for each subset in parallel (step 312). The system subsequently combines the solutions for all the subsets and constructs a new SVM (step 314).

Illustrative Results

Figure 4:
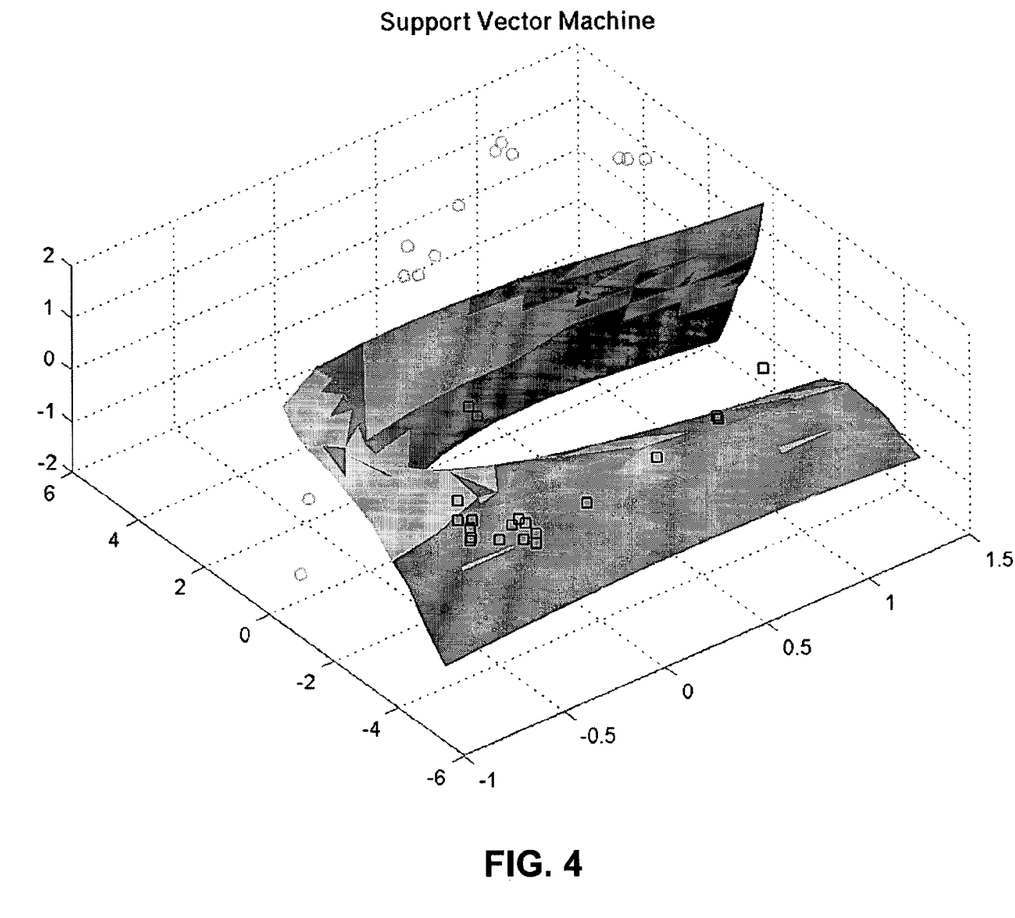
FIG. 4 illustrates a set of exemplary data vectors and a separating hyperplane in accordance with an embodiment of the present invention.

FIG. 4 illustrates a set of exemplary data vectors and a separating hyperplane in accordance with an embodiment of the present invention. This example demonstrates the results obtained with one embodiment of the present invention after its reduction to practice. Shown in FIG. 4 is a large training data set which presents a particularly vexing challenge for classification-type pattern recognition. The objective is to find an optimal separation of the two types data vectors. As can be observed in FIG. 4, this is a challenging problem because of the "double horseshoe" relationship between the two types of data vectors. It is obvious that a naïve approach that produces a linear separating plane will result in numerous misidentifications.

The system partitions the original data set into two subsets and solves the problem using the high-level parallelization method disclosed herein. FIG. 4 shows the SVM solution of the entire problem. (Only some of the data points are shown on FIG. 4 for clarity purposes.) The recorded computation time is reduced from about 16 time units using a conventional solver to 3 time units using the high-level parallelization method. This indicates an approximately 5× speedup factor.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for identifying a support vector machine (SVM) to facilitate classification of a set of life science data, comprising:
   receiving a training dataset comprised of a number of data vectors;
   setting an initial SVM to be a current SVM;
   iteratively performing:
      determining to what extent each data vector violates conditions associated with the current SVM;
      sorting the data vectors based on each data vector's degree of violation;
      partitioning the sorted data vectors into a number of prioritized subsets, wherein the subset with the highest priority contains the largest number of violators with the highest degree of violation;
      solving in parallel a quadratic problem (QP) optimization problem for each subset based on the subset's priority; and
      constructing a new SVM to replace the current SVM based on the QP optimization solution for each subset; wherein the new SVM becomes current SVM, and
      wherein solving the QP optimization problem for each subset based on the subset's priority involves formulating an objective function for the QP optimization problem, and wherein the objective function includes interaction terms which are based on subsets whose priority is lower than the present subset's priority;
   discontinuing the iterative operations when conditions associated with the current SVM are met; and
   producing the current SVM as the final SVM which can facilitate classification of the set of life science data.

2. The method of claim 1, wherein if any data vector in the dataset violates conditions associated with the new SVM, the method further comprises iteratively performing the following operations until no data vector violates conditions associated with the SVM:
   determining to what extent each data vector violates conditions associated with a current SVM;
   sorting the data vectors based on each data vector's degree of violation;
   partitioning the sorted data vectors into a number of prioritized subsets, wherein the subset with the highest priority contains the largest number of violators with the highest degree of violation;
   solving in parallel a QP optimization problem for each subset based on the subset's priority; and
   constructing a new SVM to replace the current SVM based on the QP optimization solution for each subset.

3. The method of claim 2, wherein constructing the new SVM involves combining the QP optimization solution obtained in the current iteration for the subset with the highest priority with the QP optimization solutions obtained in the previous iteration for the rest subsets.

4. The method of claim 1, wherein sorting the data vectors involves sorting the data vectors in a descending order with respect to each data vector's degree of violation.

5. The method of claim 1, wherein the initial SVM contains either no support vectors, or a set of existing support vectors obtained based on prior knowledge of the dataset.

6. The method of claim 1, wherein determining whether any vector in the dataset violates conditions associated with the SVM involves evaluating whether each data vector violates Karush-Kuhn-Tucker (KKT) conditions for the current SVM.

7. A computer-readable storage medium storing instructions that when executed by a computer cause the computer to perform a method for identifying an SVM to facilitate classification of a set of life science data, the method comprising:
   receiving a training dataset comprised of a number of data vectors;
   setting an initial SVM to be a current SVM;
   iteratively performing:
      determining to what extent each data vector violates conditions associated with the current SVM;
      sorting the data vectors based on each data vector's degree of violation;
      partitioning the sorted data vectors into a number of prioritized subsets, wherein the subset with the highest priority contains the largest number of violators with the highest degree of violation;
      solving in parallel a quadratic problem (QP) optimization problem for each subset based on the subset's priority; and
      constructing a new SVM to replace the current SVM based on the QP optimization solution for each subset; wherein the new SVM becomes current SVM, and
      wherein solving the QP optimization problem for each subset based on the subset's priority involves formulating an objective function for the QP optimization problem, and wherein the objective function includes interaction terms which are based on subsets whose priority is lower than the present subset's priority;
   discontinuing the iterative operations when conditions associated with the current SVM are met; and
   producing the current SVM as the final SVM which can facilitate classification of the set of life science data.

8. The computer-readable storage medium of claim 7, wherein if any data vector in the dataset violates conditions associated with the new SVM, the method further comprises iteratively performing the following operations until no data vector violates conditions associated with the SVM:
   determining to what extent each data vector violates conditions associated with a current SVM;
   sorting the data vectors based on each data vector's degree of violation;
   partitioning the sorted data vectors into a number of prioritized subsets, wherein the subset with the highest priority contains the largest number of violators with the highest degree of violation;
   solving in parallel a QP optimization problem for each subset based on the subset's priority; and
   constructing a new SVM to replace the current SVM based on the QP optimization solution for each subset.

9. The computer-readable storage medium of claim 8, wherein constructing the new SVM involves combining the QP optimization solution obtained in the current iteration for the subset with the highest priority with the QP optimization solutions obtained in the previous iteration for the rest subsets.

10. The computer-readable storage medium of claim 7, wherein sorting the data vectors involves sorting the data vectors in a descending order with respect to each data vector's degree of violation.

11. The computer-readable storage medium of claim 7, wherein the initial SVM contains either no support vectors, or a set of existing support vectors obtained based on prior knowledge of the dataset.

12. The computer-readable storage medium of claim 7, wherein determining whether any vector in the dataset violates conditions associated with the SVM involves evaluating whether each data vector violates Karush-Kuhn-Tucker (KKT) conditions for the current SVM.

13. An apparatus for identifying an SVM to facilitate classification of a set of life science data, comprising:

a receiving mechanism configured to receive a training dataset comprised of a number of data vectors;

an iteration mechanism configured to set an initial SVM to be a current SVM and to iteratively perform SVM training, wherein the iteration mechanism comprises:

a decision mechanism configured to determine to what extent each data vector violates conditions associated with a current SVM;

a sorting mechanism configured to sort the data vectors based on each data vector's degree of violation;

a partition mechanism configured to partition the sorted data vectors into a number of prioritized subsets, wherein the subset with the highest priority contains the largest number of violators with the highest degree of violation;

a solving mechanism configured to solve in parallel a quadratic problem (QP) optimization problem for each subset based on the subset's priority; and a construction mechanism configured to construct a new SVM to replace the current SVM based on the QP optimization solution for each subset; wherein the new SVM becomes current SVM, and wherein while solving the OP optimization problem for each subset based on the subset's priority, the solving mechanism is configured to formulate an objective function for the OP optimization problem, and wherein the objective function includes interaction terms which are based on subsets whose priority is lower than the present subset's priority;

wherein the iteration mechanism is configured to discontinue the iterative operations when conditions associated with the current SVM are met; and a result producing mechanism configured to produce the current SVM as the final SVM which can facilitate classification of the set of life science data.

14. The apparatus of claim 13, wherein if any data vector in the dataset violates conditions associated with the new SVM, the apparatus is configured to perform the following operations iteratively until no data vector violates conditions associated with the SVM:

determining to what extent each data vector violates conditions associated with a current SVM;

sorting the data vectors based on each data vector's degree of violation;

partitioning the sorted data vectors into a number of prioritized subsets, wherein the subset with the highest priority contains the largest number of violators with the highest degree of violation;

solving in parallel a QP optimization problem for each subset based on the subset's priority; and constructing a new SVM to replace the current SVM based on the QP optimization solution for each subset.

15. The apparatus of claim 14, wherein while constructing the new SVM, the construction mechanism is configured to combine the QP optimization solution obtained in the current iteration for the subset with the highest priority with the QP optimization solutions obtained in the previous iteration for the rest subsets.

16. The apparatus of claim 13, wherein while sorting the data vectors, the sorting mechanism is configured to sort the data vectors in a descending order with respect to each data vector's degree of violation.

17. The apparatus of claim 13, wherein the initial SVM contains either no support vectors, or a set of existing support vectors obtained based on prior knowledge of the dataset.

* * * * *

UNITED STATES PATENT AND TRADEMARK OFFICE
CERTIFICATE OF CORRECTION

| | |
|---|---|
| PATENT NO. | : 7,231,376 B1 |
| APPLICATION NO. | : 11/111031 |
| DATED | : June 12, 2007 |
| INVENTOR(S) | : Filiz Gurtuna et al. |

It is certified that error appears in the above-identified patent and that said Letters Patent is hereby corrected as shown below:

At column 11, line 34, please delete the phrase, "OP optimization" and replace with the phrase --QP Optimization--.

At column 11, line 37, please delete the phrase, "OP optimization" and replace with the phrase --QP Optimization--.

Signed and Sealed this

Twenty-fourth Day of July, 2007

JON W. DUDAS
*Director of the United States Patent and Trademark Office*